United States Patent [19]
Hasebe

[11] Patent Number: 5,987,609
[45] Date of Patent: Nov. 16, 1999

[54] SYSTEM FOR REMOTELY SECURING/ LOCKING A STOLEN WIRELESS DEVICE VIA AN EMAIL MESSAGE

[75] Inventor: Mikio Hasebe, Gyoda, Japan

[73] Assignee: Kabushiki Kaisha Toshiba, Kawasaki, Japan

[21] Appl. No.: 08/943,138

[22] Filed: Oct. 3, 1997

[30] Foreign Application Priority Data

Oct. 3, 1996 [JP] Japan .................................. 8-263084

[51] Int. Cl.$^6$ ........................... G06F 12/14; G06F 13/00; G06F 7/00
[52] U.S. Cl. ........................... 713/200; 713/201; 713/202
[58] Field of Search .................................... 713/200, 201, 713/202

[56] References Cited

U.S. PATENT DOCUMENTS

| 5,276,729 | 1/1994 | Higuchi et al. ........................... 379/58 |
| 5,613,196 | 3/1997 | Barnes et al. .............................. 455/15 |
| 5,748,084 | 5/1998 | Iisikoff .................................... 340/568 |

FOREIGN PATENT DOCUMENTS 6-35858  2/1994  Japan .
9-81480  3/1997  Japan .

OTHER PUBLICATIONS

Patent Abstract of Japan, Publication No. 06035858 A, Oct. 2, 1994, Sakuma Hiroya Terminal Equipment and its Security Protecting Method.
IBM Research Disclosure, UK, vol. 42, NR 417; "Email Controlled Devices", Jan. 1999.

*Primary Examiner*—Robert W. Beausoliel, Jr.
*Assistant Examiner*—Brian H. Shaw
*Attorney, Agent, or Firm*—Pillsbury Madison & Sutro LLP

[57] ABSTRACT

A system for remotely securing or locking a wireless information device is provided by sending an Email message with an attached password to the device. The owner of an information device specifies a password and a security level beforehand. The specified information is stored in a memory. When an electronic mail is received from another information device through a wireless telephone facility of the information device, a password attached to the electronic mail is checked with the password stored in the memory. When the password match occurs, a security process corresponding to the security level stored in the memory is executed. Security processes include processes of display screen lock, owner indication, and data erase. Thus, in the case where the information device should be lost or stolen, the leakage of data to others can be prevented.

22 Claims, 8 Drawing Sheets

SYSTEM FOR REMOTELY SECURING/ LOCKING A STOLEN WIRELESS DEVICE VIA AN EMAIL MESSAGE

BACKGROUND OF THE INVENTION

The present invention relates to an information device having a security facility that provides the protection of data against unauthorized access by others and a method therefor, and more specifically to a portable information device that permits communications of electronic mail with no mail server involved and a method for providing the security of data.

In recent years, electronic mail by personal computers and word processors has spread rapidly to companies and individuals. In order for a company or an individual to employ electronic mail, it is required to install a host computer adapted for electronic mail in the company or join a commercial electronic mail service (personal computer communications service such as NIFTY Serve, or the like).

In the conventional electronic mail systems, mail (character string data) to be interchanged between information devices is stored in the bulk storage of an in-company electronic mail computer, called a mail server, or a commercial electronic mail service computer. Both the sender and the receiver make access to (call) the mail server mainly via telephone lines.

FIG. 1 shows a conventional electronic mail system. In the conventional system, information devices, such as personal digital assistants (PDAs), interchange mail via a mail server 2.

As an example, to send mail data from the information device 1a to the information device 1b, the information device 1a first makes access to the mail server 2 and then sends the mail data addressed to the information device 1b to the mail server 2. The information device 1b likewise makes access to the mail server and receives from the mail server the mail data addressed to it.

As described above, a mail server (computer) adapted to store and interchange mail data is dispensable for the conventional electronic mail system. That is, mail interchange between information devices cannot be achieved without making access to the mail server. Thus, it cannot be said that the conventional electronic mail system can be employed easily by anyone. For this reason, an implementation of a simple electronic mail system has been desired which, unlike the conventional electronic mail system, allows mail interchange among information devices with no mail server involved.

FIG. 2 shows an arrangement of such a simple electronic mail system. Information devices 10a, 10b and 10c each have a digital telephone facility built in. Each of the information devices is equipped with a facility for directly sending or receiving electronic mail to or from another information device. In this case, information devices can be used which have a built-in wireless telephone facility such as the personal handyphone system (PHS) which is a digital simplified telephone system adopted in Japan. With such an arrangement, electronic mail can be interchanged among the information devices 10a, 10b and 10c freely with no mail server involved.

If the simplified electronic mail system as shown in FIG. 2 is used in place of the conventional electronic mail system shown in FIG. 1, then mail data, which, in the conventional system, are managed by the mail server, will be managed by individual information devices. In this case, there will arise the following problems.

In the simplified electronic mail system, mail data are held on individual information devices. In case where the owner of an information device should leave it somewhere or he or she should have it stolen, there arises the possibility that another person may use it to know mail data. In this case, even if the owner is aware that the information device has been missing, he or she cannot take any countermeasures against it.

To solve the problem of data leakage to others, a method for security will be conceived which sets information devices to demand of each user the entry of a password each time he or she activates his or her information device to thereby allow data to be made open only to authorized users. With this method, however, users who have to activate and stop their information device over and over again a day will feel troublesome for an operation of entering a password each time they activate it. For this reason, it cannot be said that it is preferable to use such a method.

BRIEF SUMMARY OF THE INVENTION

Accordingly, it is an object of the present invention to provide an information device which permits the prevention of data from being leaked out to others when it is missing, with no need of entering a password or the like in the normal use of it and a security method therefor.

According to an aspect of the present invention, there is provided an information device for a wireless communication with a network that allows transmission and reception of electronic mails, comprising: means for storing a password; means for storing a security level; means for checking a password attached to an electronic mail with the password stored by the password storing means in response to the reception of the electronic mail from the network; and security process execution means for, when the password match occurs, executing a security process corresponding to the security level stored by the security level storing means.

According to another aspect of the present invention, there is provided an information device for a wireless communication with a network that allows transmission and reception of electronic mails, comprising: means for performing an editing operation of inserting into an electronic mail to be transmitted a password adapted to allow another information device to perform a security process in it; and means for transmitting the electronic mail into which the password has been inserted to the another information device.

According to still another aspect of the present invention, there is provided an electronic mail system having first and second information devices for a wireless communication with a network that allows transmission and reception of electronic mails, the first information device comprising: means for storing a password; means for storing a security level; means for checking a password attached to an electronic mail with the password stored by the password storing means in response to the reception of the electronic mail from the network; and means for, when the password match occurs, executing a security process corresponding to the security level stored by the security level storing means; and the second information device comprising: means for performing an editing operation of inserting into an electronic mail to be transmitted a password adapted to allow the first information device to perform the security process in it; and means for transmitting the electronic mail into which the password has been inserted to the second information device.

According to a further aspect of the present invention, there is provided a method of implementing security for an information device having a wireless telephone facility that allows transmission and reception of electronic mails, comprising the steps of: storing a specified password and security level into a memory; checking a password attached to an electronic mail with the password stored in the memory in response to the reception of the electronic mail from the network; and when the password match occurs, executing a security process corresponding to the security level stored in the memory.

According to another aspect of the present invention, there is provided a method of implementing security for a first information device for a wireless communication with a network that allows transmission and reception of electronic mails, comprising the steps of: on the side of a second information device, performing an editing operation of inserting into an electronic mail to be transmitted a password adapted to allow the first information device to perform a security process in it; and transmitting the electronic mail into which the password has been inserted to the first information device.

According to still another aspect of the present invention, there is provided a method of implementing security for a first information device for a wireless communication with a network that allows transmission and reception of electronic mails, comprising the steps of: on the side of the first information device, storing a specified password and security level in a memory; on the side of a second information device, performing an editing operation of inserting a password into an electronic mail to be transmitted; transmitting the electronic mail into which the password has been inserted from the second information device to the first information device; on the side of the first information device, checking the password in the electronic mail with the password stored in the memory in response to the reception of the electronic mail from the network; and on the side of the first information device, executing a security process corresponding to the security level stored in the memory.

According to a further aspect of the present invention, there is provided a storage medium having program code instructions stored thereon which are readable by an information device for a wireless communication with a network that allows transmission and reception of electronic mails, the instructions comprising: when a password and a security level are specified, storing the contents thereof in a memory; checking a password attached to an electronic mail with the password stored in the memory in response to the reception of the electronic mail from the network; and when the password match occurs, executing a security process corresponding to the security level stored in the memory.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiment of the present invention and, together with the general description given above and the detailed description of the preferred embodiment given below, serve to explain the principles of the present invention in which.

DETAILED DESCRIPTION OF THE INVENTION

A preferred embodiment of the present invention will now be described with reference to the accompanying drawings.

Figure 3:
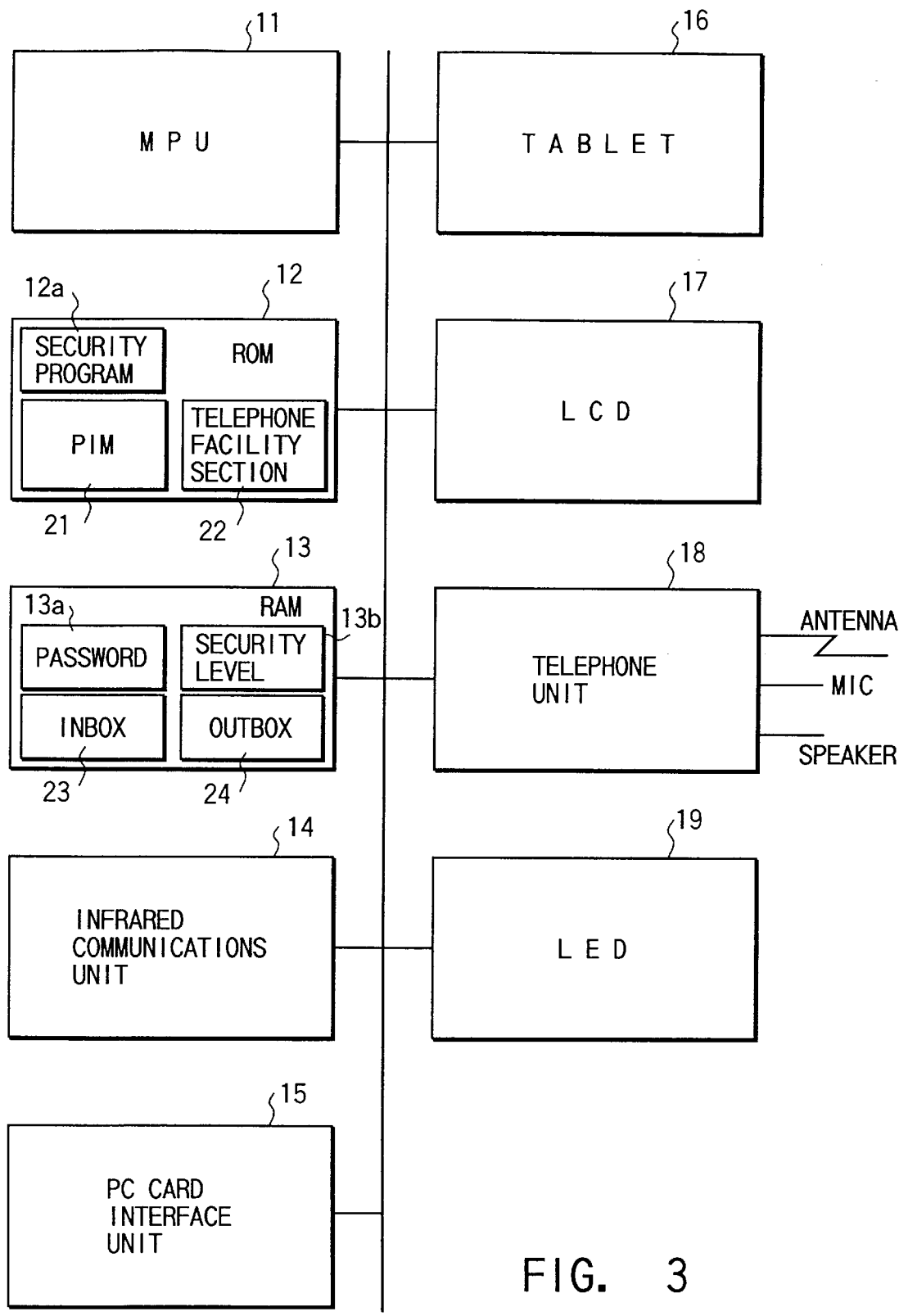
FIG. 3 is a block diagram of a hardware implementation of an information device according to an embodiment of the present invention.

Referring now to FIG. 3, there is illustrated in block diagram form a hardware implementation of an information device according to an embodiment of the present invention. This information device is a portable information device that has a wireless telephone facility such as the PHS which is one of digital simplified telephone systems and has been adopted in Japan. The wireless telephone facility allows not only transmission and reception of usual voice data but also transmission and reception of mail data in the format of MIME (Multipurpose Internet Mail Extensions) or mail data based on personal computer communications services such as NIFTY-Serve and the like.

In FIG. 3, reference numeral 11 denotes a micro processing unit (MPU) that controls the entire information device.

Reference numeral 12 denotes a ROM which is used as fixed storage and stores program codes, a dictionary for kana-to-kanji translation, etc. In addition, the ROM 12 has a security program storage area 12a stored with a security program and also stores a PIM (Personal Information Manager) 21, which will be described later with reference to FIG. 5, and software for a telephone facility section 22.

Reference numeral 13 denotes a RAM used as main storage, in which various items of data are stored for processing by the MPU 11. In addition, the RAM 13 has a password storage area 13a for storing a password (which will be described later) that is specified by the information device owner, a security level storage area 13b for storing a security level (to be described later) that is likewise specified by the information device owner, and buffer areas for INBOX 23 and OUTBOX 24 which will be described with reference to FIG. 5.

The password stored in the storage area 13a differs in nature from the password used in the conventional system and is used in case of emergency where the information device is lost or stolen. That is, the password stored in the storage area 13a is used to check a password indicating a security processing instruction when it is sent from another information device.

Reference numeral 14 denotes an infrared communications unit for data interchange with another information device. Reference numeral 15 denotes a PC card interface unit adapted for PCMCIA, which makes various types of PC cards available. Reference numeral 16 denotes a tablet for pen-based data entry. Reference numeral 17 denotes a liquid crystal display (LCD) for displaying the contents of electronic mail that is sent or received, and so on.

Reference numeral 18 denotes a wireless telephone unit for sending/receiving voice data or mail data by radio. Reference numeral 19 denotes a light emitting diode (LED) for indicating that electronic mail or the like is being received.

Figure 4:
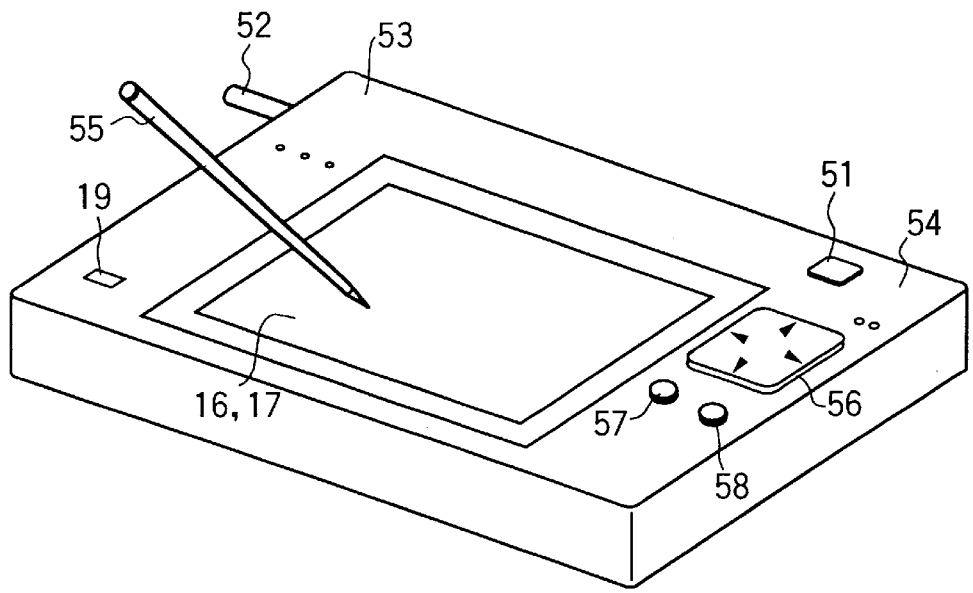
FIG. 4 is a perspective view of the information device of FIG. 3.

FIG. 4 is a perspective view of the portable information device.

Reference numeral 51 denotes a power button that is used to turn the information device on and off. Reference numeral 52 denotes an antenna which is used to send or receive voice data or mail data. Reference numeral 53 denotes a loudspeaker which, when the telephone facility is implemented, reproduces voice of the user at the station with which the connection has been set up. Reference numeral 54 denotes a microphone which, when the telephone facility is implemented, picks up user's voice. Reference numeral 55 denotes a pen which is used to write characters and figures on the tablet 16 for data entry. Reference numeral 56 denotes a cursor key which is used to make a choice from various items displayed on the LCD 17. Reference numeral 57 denotes a telephone button which is used in implementing the telephone facility. Reference numeral 58 denotes a talking button which is used for talking through the telephone facility.

Figure 5:
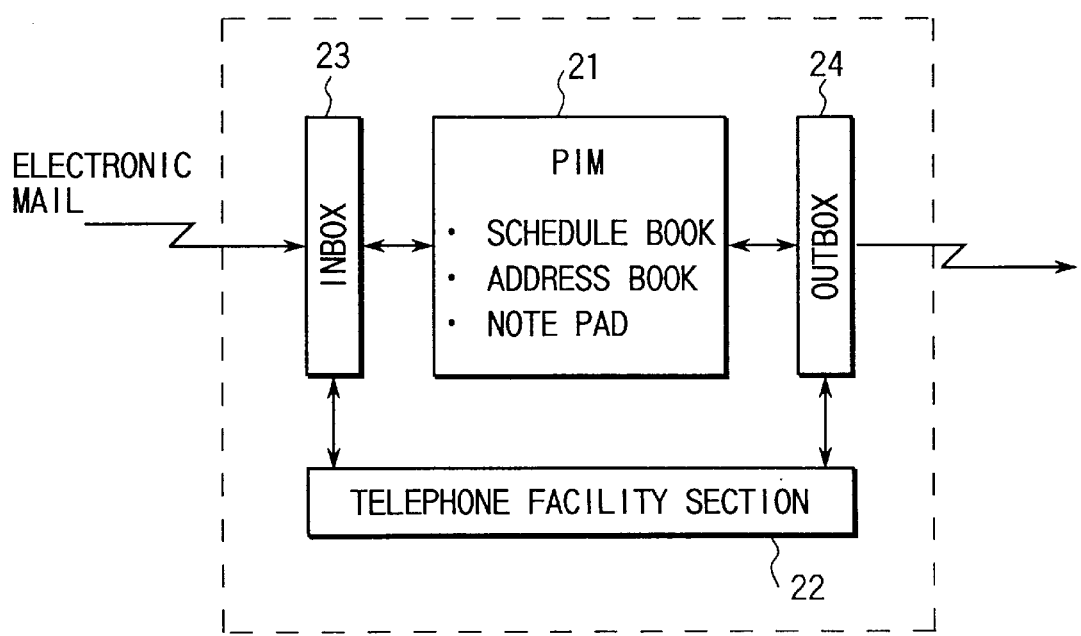
FIG. 5 is a schematic illustration of facilities of the information device of FIG. 3.

FIG. 5 shows functions of the information device. In addition to the PIM 21 having personal information manage functions such as a schedule book, address book, notepad, etc., the information device has the digital telephone facility 22 added or built in. It should be noted here that the telephone facility can be added by the use of a PC card as an example.

The telephone facility allows mail data as well as usual voice data to be transmitted/received. In this case, mail data received from another information device is stored in the INBOX 23 serving as an input buffer. On the other hand, mail data created by the notepad function in the PIM 21 for transmission to another information device is stored in the OUTBOX 24 serving as an output buffer.

To facilitate the understanding of the present invention, a simplified electronic mail system used in the embodiment will be described with reference to FIG. 2.

Figure 1:
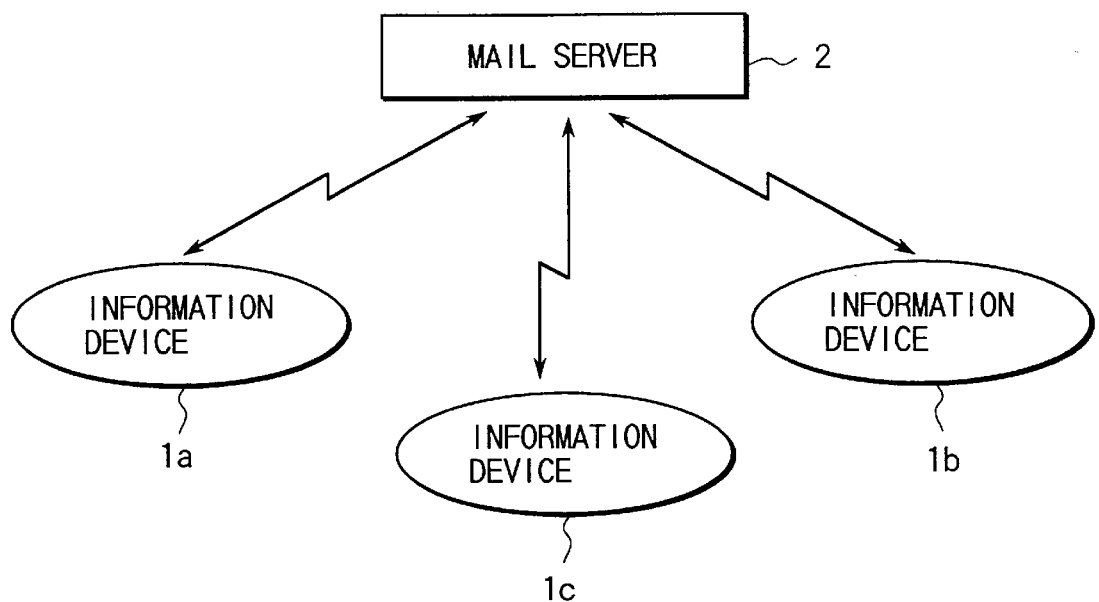
FIG. 1 is a schematic illustration of a conventional electronic mail system.
Figure 2:
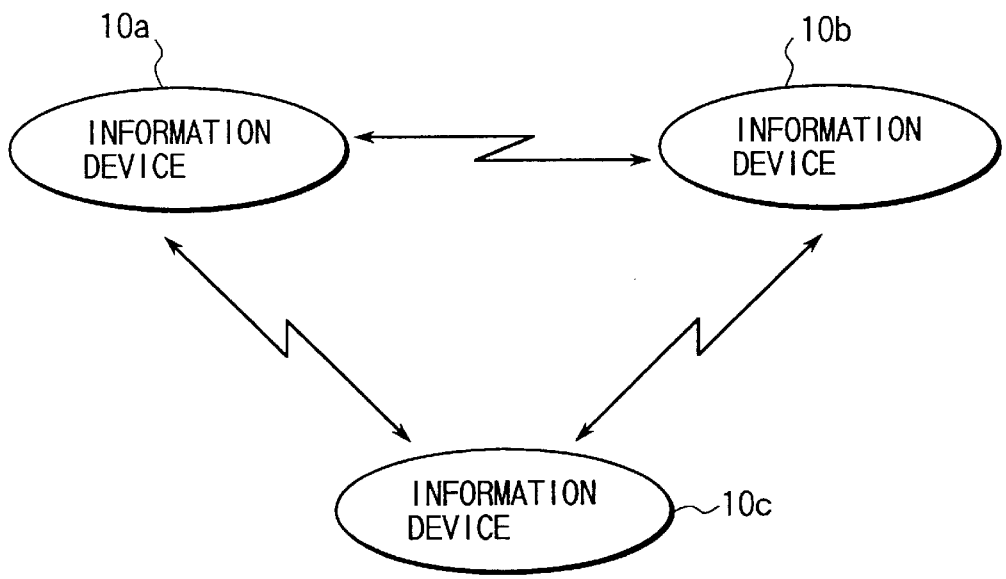
FIG. 2 is a schematic illustration of a new electronic mail system.

In FIG. 2, the information devices 10a, 10b and 10c comprise the simplified electronic mail system. As described previously, each information device has a built-in function of directly transmitting or receiving mail data to or from an information device at the other end. Unlike the conventional system shown in FIG. 1, therefore, the simplified electronic mail system allows mail data to be interchanged among the information devices 10a, 10b and 10c with no mail server involved.

The mail data transmitting/receiving function in the telephone facility 22 can be performed independently of the other functions. Even if, when the information device is placed in the mail data receive state, it is operated by the user, mail data sent from another information device will be received automatically and then stored in the INBOX 23. When the user later terminates the operation and confirms that electronic mail has been received, he or she can immediately watch mail data in the INBOX 23 on the screen of the LCD 17.

In the case of mail transmissions, on the other hand, the user creates mail data online using the notepad function in the PIM installed in the information device, chooses a recipient or recipients using the telephone directory function, then places the mail data into the OUTBOX 24, so that the mail data is placed in the wait state for transmission.

When several items of mail data have been stored, the mail sending function is activated and the state of connection with another information device is confirmed. If transmission is possible, the items of mail data (waiting mail) in the OUTBOX 24 are automatically sent in sequence to the another information device. Later, the user can know the mail data transmission conditions by examining the OUTBOX 24. If an item of mail data which has not been sent is found, it can be retransmitted automatically to the corresponding information device.

The simplified electronic mail system can be combined with the conventional mail-server-based electronic mail system, which will allow electronic mail to be employed more flexibly.

Figure 6:
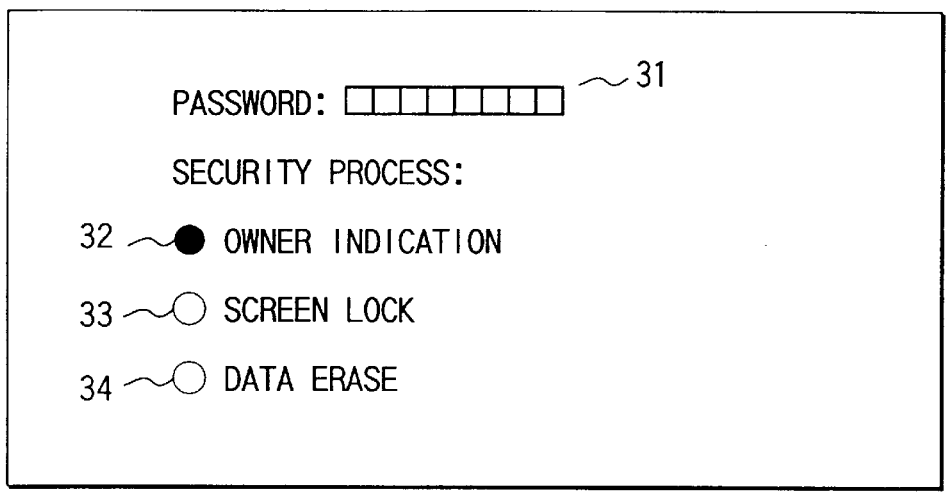
FIG. 6 is a schematic illustration of security settings on the LCD of the information device of FIG. 3.
Figure 7:
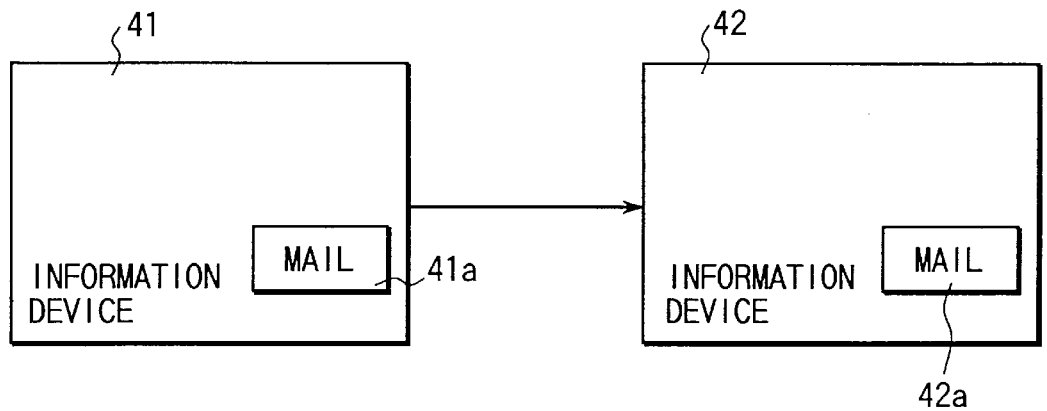
FIG. 7 shows data communications between information devices of FIG. 3.

FIG. 6 shows the security setting screen of the information device of the invention. To provide against the information device being lost or stolen, the owner specifies a password and a security process in advance on the security setting screen of the LCD 17 as shown in FIG. 6.

As shown in FIG. 6, a password entry field 31 is set up on the security setting screen. The password entry field can accommodate a password of eight digits for example. The owner enters a desired password into that field through the tablet 16. This password is used for the owner to activate the security facility of the information device from a remote location in case of emergency. The information device has a built-in function of checking a password attached to mail data sent from another information device. The function is performed certainly when mail data including the password is received and cannot be stopped by a person using the information device.

In addition, security levels 32, 33 and 34 are set up on the security setting screen. Here, "owner indication" is set as the security level 32, "screen lock" as the security level 33, and "data erase" as the security level 34. The information device owner makes a choice from among these security levels.

Here, "owner indication" means the display of data that identifies the information device owner, such as name, telephone number, or the like, on the LCD 17, "screen lock" means the prohibition of data display on the LCD 17, and "data erase" means the erasing of all data the information device holds or erasing of data that have been specified beforehand as candidates for erasing.

The password information specified on the security setting screen is stored in the password storage area 13a of the RAM 13. The information about the chosen security level is stored in the security level storage area 13b of the RAM 13.

In the security program storage area 12a of the ROM 12 there has been stored beforehand a program that executes the security process corresponding to the previously specified security level when a password sent from another information device matches the password specified beforehand by the owner. Since this program is set up on the ROM, it cannot be altered or erased by a person using the information device.

The security processing will be described next.

Here, the processing will be described in terms of information devices 41 and 42 adapted to transmit/receive mail data for the purpose of simplifying the description. It is assumed here that the owner of the information device 42 has left it somewhere and hence operates it from the remote information device 41 so that the security processing will be performed. In this case, the information device 42 becomes an object of security. When a predetermined password is sent from the information device 41 to the information device 42, the security processing is performed on the receiving side.

Before describing the operation of the information devices, a technique of sending a password from the information device 41 to the information device 42 will be described.

Figure 8:
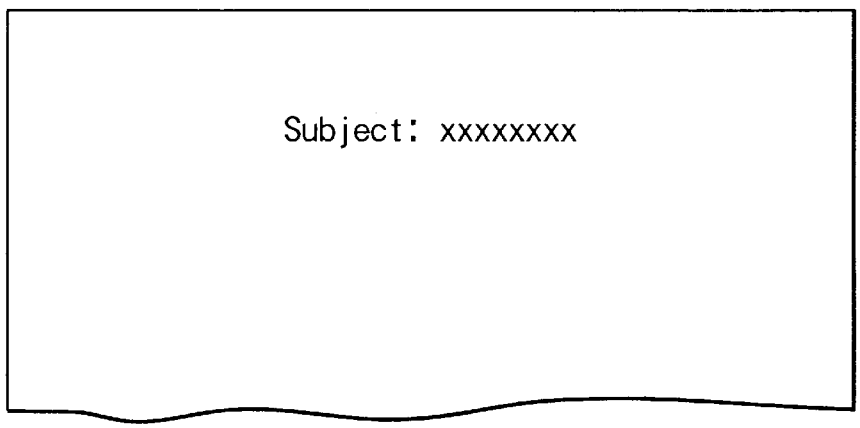
FIG. 8 shows the form of a password to be sent by the information device of FIG. 3.

In this embodiment, a password can be transmitted in a message header defined by the MIME that is the Internet electronic mail standard. That is, as shown in FIG. 8, a password is inserted into a header field defined by the MIME as its subject. In this case, the password is described in the form of encoded binary data although it is not shown in detail in FIG. 8. The use of such a technique allows a password to be transferred between the information devices 41 and 42 that support the MIME.

Figure 9:
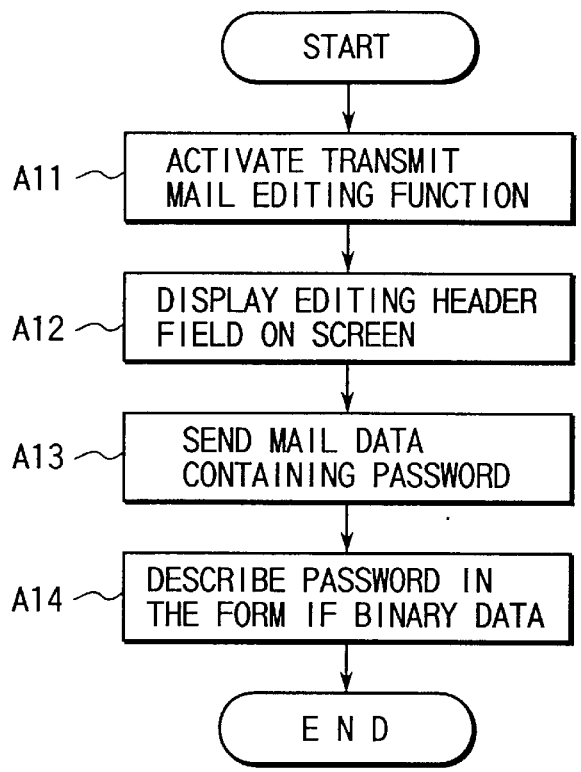
FIG. 9 is a flowchart for the password transmission procedure of the information device of FIG. 3.

FIG. 9 illustrates a process flow of the information device 42 at the time of receiving data.

The owner of the information device 42 activates a function of editing transmit mail based on the MIME on the other information device 41 (step A11). The owner of the information device 42 causes the screen for editing the header field defined by the MIME to appear on the LCD (step A12). The owner then fills in a password in the form of binary data into the subject field as shown in FIG. 8 (step A13). The password to be filled in must match the password that has been previously set up by the owner on the information device 42.

After the password has been filled in, the owner of the information device 42 sends mail data containing that password to the information device 41 (step A14).

Figure 10:
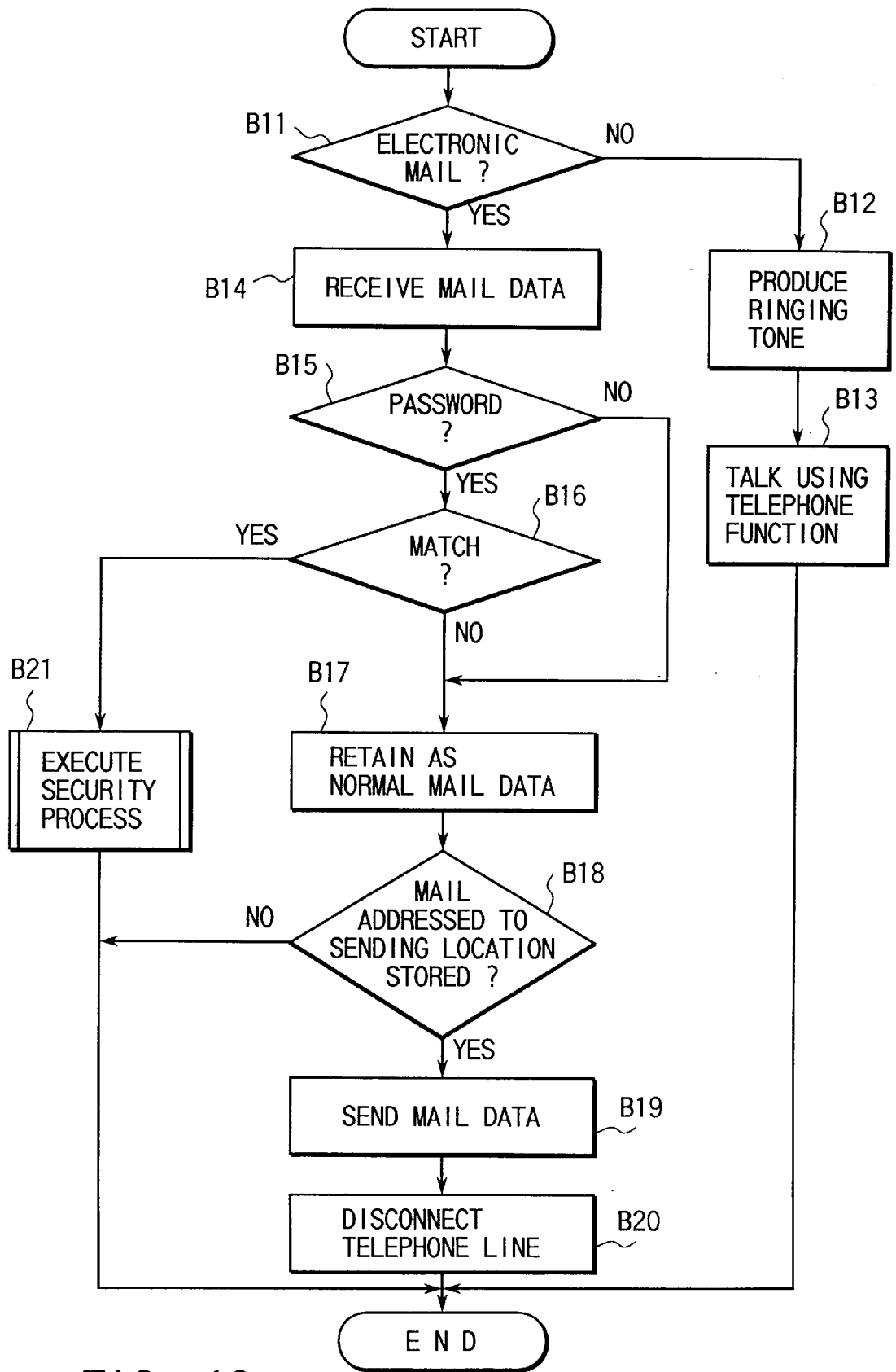
FIG. 10 is a flowchart for an operation of receiving data of the information device of FIG. 3.

FIG. 10 is a process flow of the information device 42 at the time of receiving data. It is assumed that the owner of the information device 42 that is now an object of security has already specified the password and the security level on it through the security setting screen as shown in FIG. 6. Upon receiving data sent from the information device 41 to the information device 42, the MPU 11 of the information device 42 performs the following processing.

That is, the MPU 11 first makes a decision as to whether or not data (calling packet) sent from the information device 41 to the telephone facility section 22 of the information device 42 has been sent by electronic mail (step B11). The calling packet contains identification information adapted to distinguish between mail data and voice data. By determining the identification information, the MPU can know whether the information device 42 was called by telephone or by electronic mail.

In the case of calling by telephone (not by electronic mail) (NO in step B11), the MPU 11 produces a ringing tone through the wireless telephone unit 18 (step B12) and places the telephone facility section 22 in the talking state (step B13).

In the case of calling by electronic mail (YES in step B11), on the other hand, the MPU 11 receives mail data via the wireless telephone unit 18 (step B14). The received mail data is temporarily stored in a buffer storage.

The MPU 11 then determines whether or not a password is attached to the mail data stored in the buffer (step B15). If no password is attached (NO in step B15), then the MPU 11 retains the mail data in the INBOX 23 as normal mail data (step B17).

The MPU 11 next makes access to the OUTBOX 24 to determine whether or not mail data to be send to another information device is present (step B18). This mail data has been created by the use of the notepad function of the PIM 21. In the presence of such mail data (YES in step B18), the MPU 11 sends it to that location via the wireless telephone unit 18 (step B19) and then disconnects the telephone line to enter the ready state (step B20). In the absence of such mail data (NO in step B18), on the other hand, the MPU disconnects immediately the telephone line to enter the ready state (step B20).

That is, when mail data ready for transmission to a location is present (i.e., when mail data is present in the OUTBOX 24), it can be sent automatically to the location upon receiving electronic mail from the same location. More specifically, if, when mail data 41a is sent from the information device 41 to the information device 42, mail data 42a addressed to the information device 41 is held in the information device 42, the mail data 42a can be sent to the information device 41 while the connection between the information devices 41 and 42 is being established. Conversely, if, when a location sends mail data, the receiving location holds ready mail addressed to that sending location, the sending location can also receive that mail data addressed to it.

If a password is attached to mail data (YES in step B15), but it does not match the password that is stored in the password storage area 13a of the RAM 13 (NO in step B16), then it is retained as normal mail data in the INBOX 23.

If, on the other hand, a password is attached to mail data (YES in step B15), and it matches the password stored in the password storage area 23a (YES in step B16), then the MPU 11 carries out the security processing corresponding to the specified security level (step B21).

Figure 11:
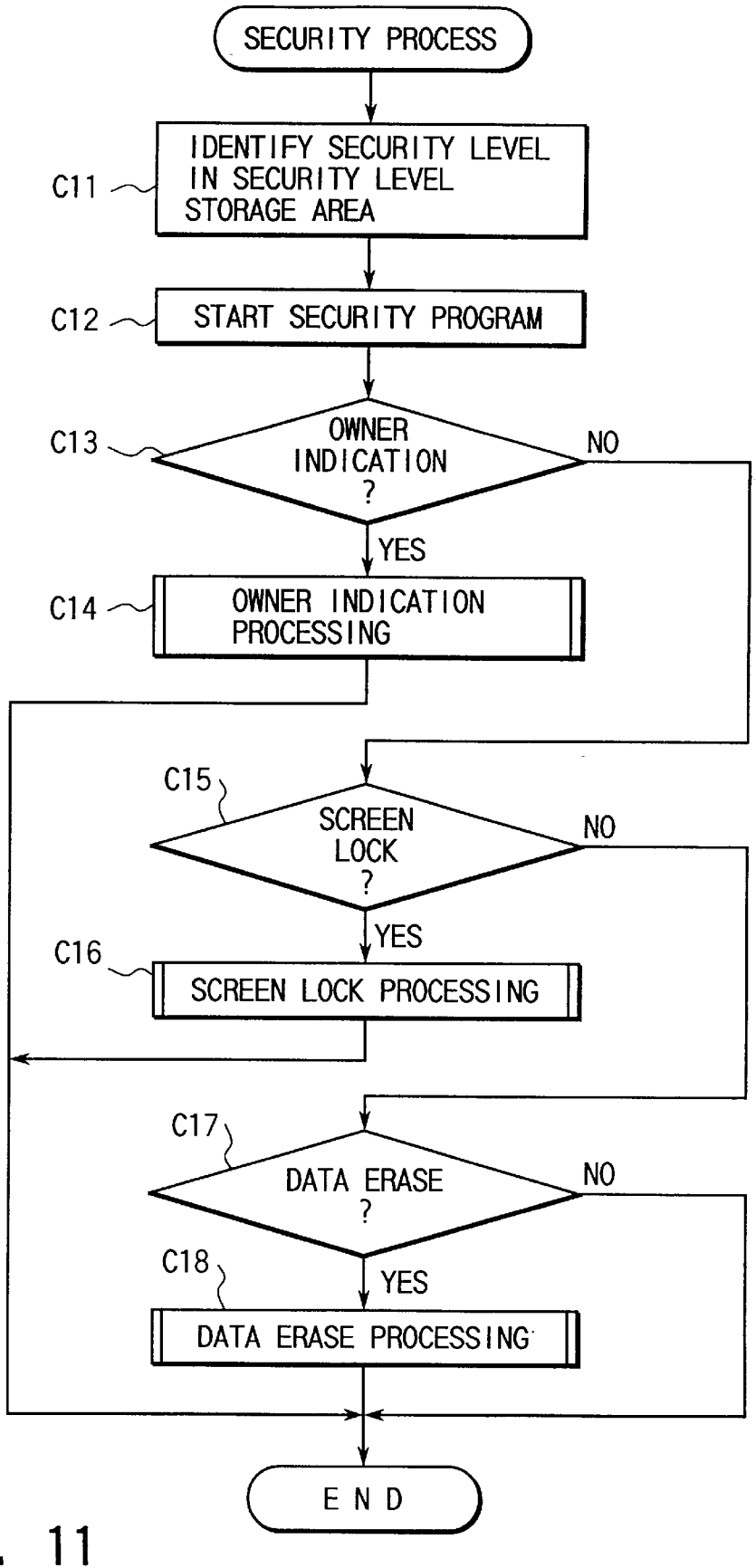
FIG. 11 is a flowchart for security processing of the information device of FIG. 3.

The security processing in step B21 will be described in detail with reference to a flowchart of FIG. 11.

That is, the MPU 11 starts a security program stored in the security program storage area 12a of the ROM 12 (step C11). As a result, the security program refers to the security level storage area 13b of the RAM 13 to identify the security level specified by the owner (step C12) and then carries out the security processing corresponding to the security level.

When the "owner indication" as the security level 32 is specified in FIG. 6 (YES in step C13), the MPU 11 performs the owner indication process (step C14). When the "screen lock" as the security level 33 is specified (YES in step C15), the MPU 11 performs the screen lock process (step C16). When the "data erase" as the security level 34 is specified (YES in step C17), the MPU 11 performs the data erase process (step C18).

Specifically, in the case of the owner indication process, the MPU 11 displays on the LCD 17 data that identifies the information device owner, such as name, telephone number, or the like. The data to identify the owner has been previously entered into the RAM 13 by the owner. In case where the owner left the information device 42 somewhere, someone might contact the owner.

When the "screen lock" is specified as the security level, the MPU 11 prohibits the display of data on the LCD 17. This will make it impossible for others to see user data held in the information device 42. To cancel the screen lock, use is made of a cancel password, which may be the same as that used in the screen lock process or may be another password.

When the data erase process is specified, the MPU 11 erases all user data held in the information device 42, or erases data that has been specified beforehand as a candidate for erasing. This allows the prevention of leakage of secret data to others in case the where the information device 42 should be stolen.

Next, specific procedures for the owner indication process, the screen lock process, and the data erase process will be described with reference to flowcharts of FIGS. 12, 13 and 14.

Figure 12:
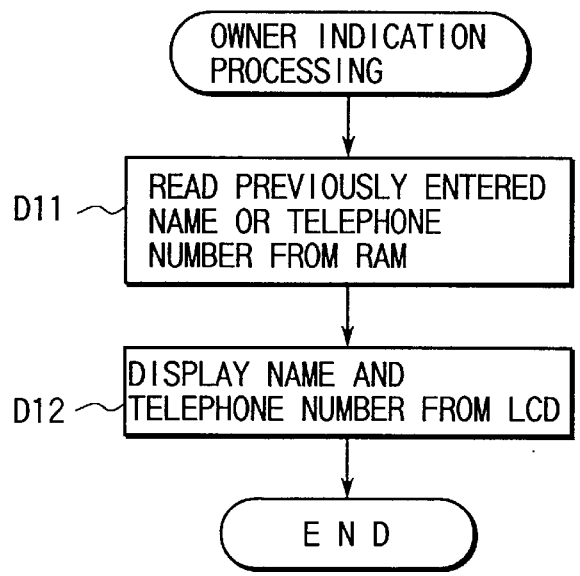
FIG. 12 is a flowchart for owner indication processing of the information device of FIG. 3.

In the owner indication process of FIG. 12, the name or telephone number that has been entered beforehand by the user is read from the RAM 13 (step D11). The name or telephone number read is displayed on the LCD 17 (step D12).

Figure 13:
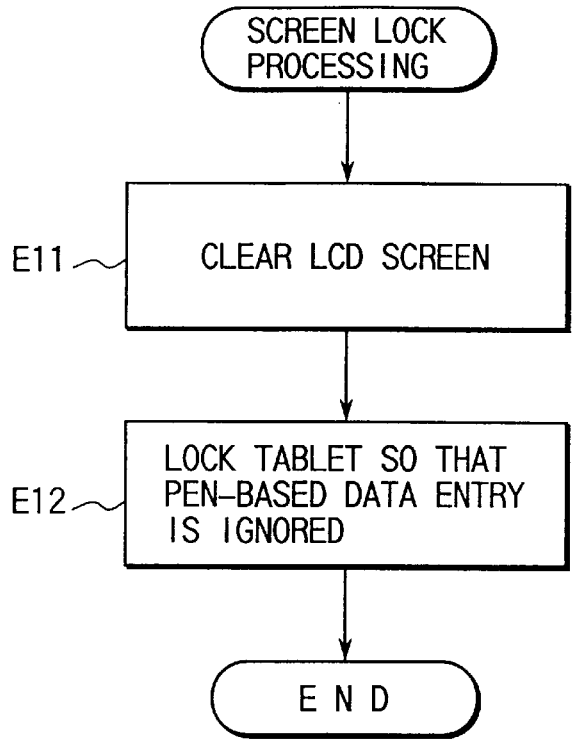
FIG. 13 is a flowchart for screen lock processing of the information device of FIG. 3.

In the screen lock process of FIG. 13, the LCD screen is cleared (step E11). The tablet 16 is next locked so that entry of data from the pen (input device) is ignored (step E12).

Figure 14:
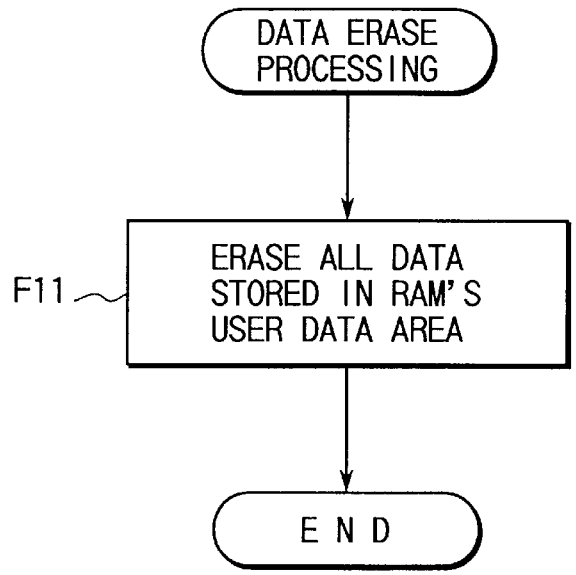
FIG. 14 is a flowchart for data erase processing of the information device of FIG. 3.

In the data erase process of FIG. 14, all the information stored in the user's data area in the RAM 13 is erased (step F11).

In a simplified electronic mail system which allows mail data to be interchanged between information devices with no mail server involved, since the owner can activate the security facility in his or her information device from a distance, data leakage to others can be prevented even if the information device should be lost or stolen.

Although the embodiment of the present invention was described as using a telephone line as the communication path, any other communications path that allows direct communications can be used to transmit/receive electronic mail. For example, slave phone-to-slave phone communication in the PHS can also be used for electronic mail.

The technique of the present invention described above can be applied to various types of devices in the form of a computer program constituted by program code instructions by writing it into a storage medium, such as a magnetic disk (floppy disk, hard disk, or the like), optical disk (CD-ROM, DVD, or the like), or semiconductor memory, or transmitting it over a communication medium. Information devices that implement the present system read the computer program recorded on a storage medium and run it to thereby perform the above-described process.

According to the present invention, as described above, a simplified electronic mail system that allows mail interchange between information devices with no mail server involved is provided. This electronic mail system allows an information device to perform a security function, such as owner indication, display screen lock, or data erase, by causing the owner of that information device to specify beforehand a password to be used and a security function to be performed in case of emergency and, in the case where that information device should be lost or stolen, allowing the owner to send the password to that information device from another information device. Thereby, the leakage of user data held in the information device to others can be prevented even if the information device should be lost or stolen.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. An information device for a wireless communication with a network that allows transmission and reception of electronic mails, comprising:

means for storing a password;

means for storing a security level;

means for checking a password attached to an electronic mail with the password stored by the password storing means in response to the reception of the electronic mail from the network; and security process execution means for, when the password match occurs, executing a security process corresponding to the security level stored by the security level storing means.

2. The information device according to claim 1, wherein the security level indicates that the display of data held in the information device should prohibited.

3. The information device according to claim 1, wherein the security level indicates that information indicating the owner of the information device should be displayed.

4. The information device according to claim 1, wherein the security level indicates that user data held in the information device should be erased.

5. The information device according to claim 1, further comprising:

means for specifying the password to be stored by the password storing means; and means for specifying the security level to be stored by the security level storing means.

6. The information device according to claim 1, wherein the security process execution means has a security processing program for performing the security process.

7. The information device according to claim 1, wherein the information device is equipped with a wireless telephone facility.

8. An information device for a wireless communication with a network that allows transmission and reception of electronic mails, comprising:

a first memory for storing a password;

a second memory for storing a security level;

a processor for checking a password attached to an electronic mail with the password stored in the first memory in response to the reception of the electronic mail from the network, and when the password match occurs, executing a security process corresponding to the security level stored in the second memory.

9. An information device for a wireless communication with a network that allows transmission and reception of electronic mails, comprising:

means for performing an editing operation of inserting into an electronic mail to be transmitted a password adapted to allow another information device to perform a security process corresponding to a security level stored in advance in said another information device and means for transmitting the electronic mail into which the password has been inserted to the another information device.

10. The information device according to claim 9, wherein the password is inserted in the form of binary data into the header field of the electronic mail.

11. An electronic mail system having first and second information devices for a wireless communication with a network that allows transmission and reception of electronic mails, the first information device comprising:

means for storing a password;

means for storing a security level;

means for checking a password attached to an electronic mail with the password stored by the password storing means in response to the reception of the electronic mail from the network; and means for, when the password match occurs, executing a security process corresponding to the security level stored by the security level storing means; and the second information device comprising:

means for performing an editing operation of inserting into an electronic mail to be transmitted a password adapted to allow the first information device to perform the security process in it; and means for transmitting the electronic mail into which the password has been inserted to the second information device.

12. A method of implementing security for an information device having a wireless telephone facility that allows transmission and reception of electronic mails, comprising the steps of:

storing a specified password and security level into a memory;

checking a password attached to an electronic mail with the password stored in the memory in response to the reception of the electronic mail from the network; and when the password match occurs, executing a security process corresponding to the security level stored in the memory.

13. The method according to claim 12, wherein the security level indicates that the display of user data held in the information device should prohibited.

14. The method according to claim 12, wherein the security level indicates that information indicating the owner of the information device should be displayed.

15. The method according to claim 12, wherein the security level indicates that user data held in the information device should be erased.

16. The method according to claim 12, further comprising the steps of:

specifying the password to be stored in the memory; and specifying the security level to be stored in the memory.

17. The method according to claim 12, wherein the security process is performed by a security processing program.

18. The method according to claim 12, wherein the information device is equipped with a wireless telephone facility.

19. A method of implementing security for a first information device for a wireless communication with a network that allows transmission and reception of electronic mails, comprising the steps of:

on the side of a second information device, performing an editing operation of inserting into an electronic mail to be transmitted a password adapted to allow the first information device to perform a security process corresponding to a security level stored in advance in said another information device and transmitting the electronic mail into which the password has been inserted to the first information device.

20. The method according to claim 19, wherein the password is inserted in the form of binary data into the header field of the electronic mail.

21. A method of implementing security for a first information device for a wireless communication with a network that allows transmission and reception of electronic mails, comprising the steps of:

on the side of the first information device, storing a specified password and security level in a memory;

on the side of a second information device, performing an editing operation of inserting a password into an electronic mail to be transmitted;

transmitting the electronic mail into which the password has been inserted from the second information device to the first information device;

on the side of the first information device, checking the password in the electronic mail with the password stored in the memory in response to the reception of the electronic mail from the network; and on the side of the first information device, executing a security process corresponding to the security level stored in the memory.

22. A storage medium having program code instructions stored thereon which are readable by an information device for a wireless communication with a network that allows transmission and reception of electronic mails, the instructions comprising:

when a password and a security level are specified, storing the contents thereof in a memory;

checking a password attached to an electronic mail with the password stored in the memory in response to the reception of the electronic mail from the network; and when the password match occurs, executing a security process corresponding to the security level stored in the memory.

* * * * *